(12) United States Patent
Schmitz et al.

(10) Patent No.: US 12,036,718 B2
(45) Date of Patent: Jul. 16, 2024

(54) METHOD FOR SWITCHING THE PRODUCTION OF A FLAT FILM MACHINE FROM A FEED PRODUCT TO A FOLLOW-ON PRODUCT

(71) Applicant: Windmöller & Hölscher KG, Lengerich (DE)

(72) Inventors: Torsten Schmitz, Lengerich (DE); Waldemar Colell, Lengerich (DE); Bernd-Alexander Groepper, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 530 days.

(21) Appl. No.: 17/287,266

(22) PCT Filed: Nov. 5, 2019

(86) PCT No.: PCT/EP2019/080215
§ 371 (c)(1),
(2) Date: Apr. 21, 2021

(87) PCT Pub. No.: WO2020/094629
PCT Pub. Date: May 14, 2020

(65) Prior Publication Data
US 2021/0323213 A1    Oct. 21, 2021

(30) Foreign Application Priority Data
Nov. 6, 2018   (DE) ..................... 10 2018 127 669.9

(51) Int. Cl.
*B29C 48/92*     (2019.01)
*B29C 48/31*     (2019.01)
(Continued)

(52) U.S. Cl.
CPC ............. *B29C 48/92* (2019.02); *B29C 48/31* (2019.02); *G05B 19/41845* (2013.01);
(Continued)

(58) Field of Classification Search
USPC ........................................................ 700/105
See application file for complete search history.

(56) References Cited

U.S. PATENT DOCUMENTS 4,017,227 A * 4/1977 Schmidt ................ B29C 55/023
425/DIG. 53
4,213,747 A    7/1980 Friedrich
(Continued)

FOREIGN PATENT DOCUMENTS

CN        107175807 A      9/2017
CN        107379494 A      11/2017
(Continued)

OTHER PUBLICATIONS

First Office Action for Chinese Application No. 201980071570.0 mailed Jun. 2, 2022, with its English summary, 10 pages.
(Continued)

*Primary Examiner* — Emilio J Saavedra
(74) *Attorney, Agent, or Firm* — Peter W. Schroen; Bret E. Field; Bozicevic, Field & Francis LLP

(57) ABSTRACT

The invention relates to a method for switching the production of a flat film machine (100) from a feed product (EP) to a follow-on product (FP), comprising the following steps:
recognizing a switching request for a switch from the feed product (EP) to the follow-on product (FP),
determining a current feed control value (ES) of at least one control variable (SG) of the flat film machine (100) for the feed product (EP),
determining a follow-on control value (FS) of the same at least one control variable (SG) for the follow-on product (FP),
(Continued)

generating a control signal (SS) for a defined variation of the at least one control variable (SG) of the flat film machine (100) from the feed control value (ES) to the follow-on control value (FS).

13 Claims, 4 Drawing Sheets

(51) Int. Cl.
| | |
|---|---|
| *G05B 19/418* | (2006.01) |
| *B29C 48/08* | (2019.01) |
| *B29C 48/25* | (2019.01) |
| *B29L 7/00* | (2006.01) |

(52) U.S. Cl.
CPC .......... *B29C 48/08* (2019.02); *B29C 48/2692* (2019.02); *B29C 2948/92133* (2019.02); *B29C 2948/92152* (2019.02); *B29C 2948/92209* (2019.02); *B29C 2948/92409* (2019.02); *B29C 2948/92447* (2019.02); *B29C 2948/92628* (2019.02); *B29C 2948/92647* (2019.02); *B29C 2948/92704* (2019.02); *B29C 2948/92904* (2019.02); *B29C 2948/92942* (2019.02); *B29L 2007/008* (2013.01); *G05B 2219/33125* (2013.01)

(56) References Cited

U.S. PATENT DOCUMENTS

| | | | |
|---|---|---|---|
| 5,397,514 A | | 3/1995 | Breil et al. |
| 5,424,018 A | | 6/1995 | Paul et al. |
| 6,152,720 A | | 11/2000 | Greb et al. |
| 6,799,961 B1 * | | 10/2004 | Freynhofer ........... B29C 48/313 |
| | | | 425/141 |
| 7,132,067 B2 | | 11/2006 | Hakoda |
| 2003/0050717 A1 | | 3/2003 | Hirata et al. |
| 2003/0075818 A1 | | 4/2003 | Morwald et al. |
| 2004/0035305 A1 | | 2/2004 | Strasser |
| 2006/0108707 A1 * | 5/2006 | Sugiura ...................... C08J 5/18 |
| | | | 264/234 |
| 2010/0143530 A1 | | 6/2010 | Park et al. |
| 2012/0315378 A1 | | 12/2012 | Yapel et al. |
| 2013/0334730 A1 * | 12/2013 | Maeder ............... B29C 48/2528 |
| | | | 264/176.1 |
| 2017/0312966 A1 | | 11/2017 | Haindl et al. |
| 2018/0093405 A1 | | 4/2018 | Backmann |
| 2018/0345619 A1 * | 12/2018 | Lang ..................... B65H 21/00 |
| 2019/0240888 A1 * | 8/2019 | Lössl ................. B29C 48/0018 |
| 2020/0014581 A1 * | 1/2020 | Aaron .................... H04L 41/40 |
| 2020/0047374 A1 | | 2/2020 | Backmann et al. |
| 2020/0130252 A1 * | 4/2020 | Wettemann ........... B29C 55/165 |

FOREIGN PATENT DOCUMENTS

| | | | |
|---|---|---|---|
| DE | 69401538 T2 | | 5/1997 |
| DE | 102005031698 A1 | | 1/2007 |
| DE | 102015108972 A1 | | 12/2016 |
| DE | 102015108979 A1 | | 12/2016 |
| DE | 102016112121 A1 | | 1/2018 |
| DE | 102016119754 A1 | | 4/2018 |
| EP | 2657000 A1 | | 10/2013 |
| EP | 2837484 A1 | | 2/2015 |
| JP | H0788068 B2 * | | 9/1995 |
| JP | 2001-30340 A | | 2/2001 |
| JP | 2004-330529 A | | 11/2004 |
| JP | 2014019079 A | | 2/2014 |
| WO | WO9306985 A1 | | 4/1993 |

OTHER PUBLICATIONS

Office Action for German Application No. 102018127669.9 mailed Jul. 3, 2019, with its English translation, 6 pages.
International Preliminary Report on Patentability for PCT Application No. PCT/EP2019/080215 mailed May 11, 2021, 7 pages.
Notice of Allowance for Chinese Application No. 201980071570.0 mailed on Jan. 5, 2023, with its English translation, 11 pages.
Office Action for German Application No. 102018127669.9 mailed on Dec. 23, 2022, with its English translation, 10 pages.
Office Action for European Application No. 19798290.3 mailed on Sep. 8, 2023, with its English translation, 8 pages.

* cited by examiner

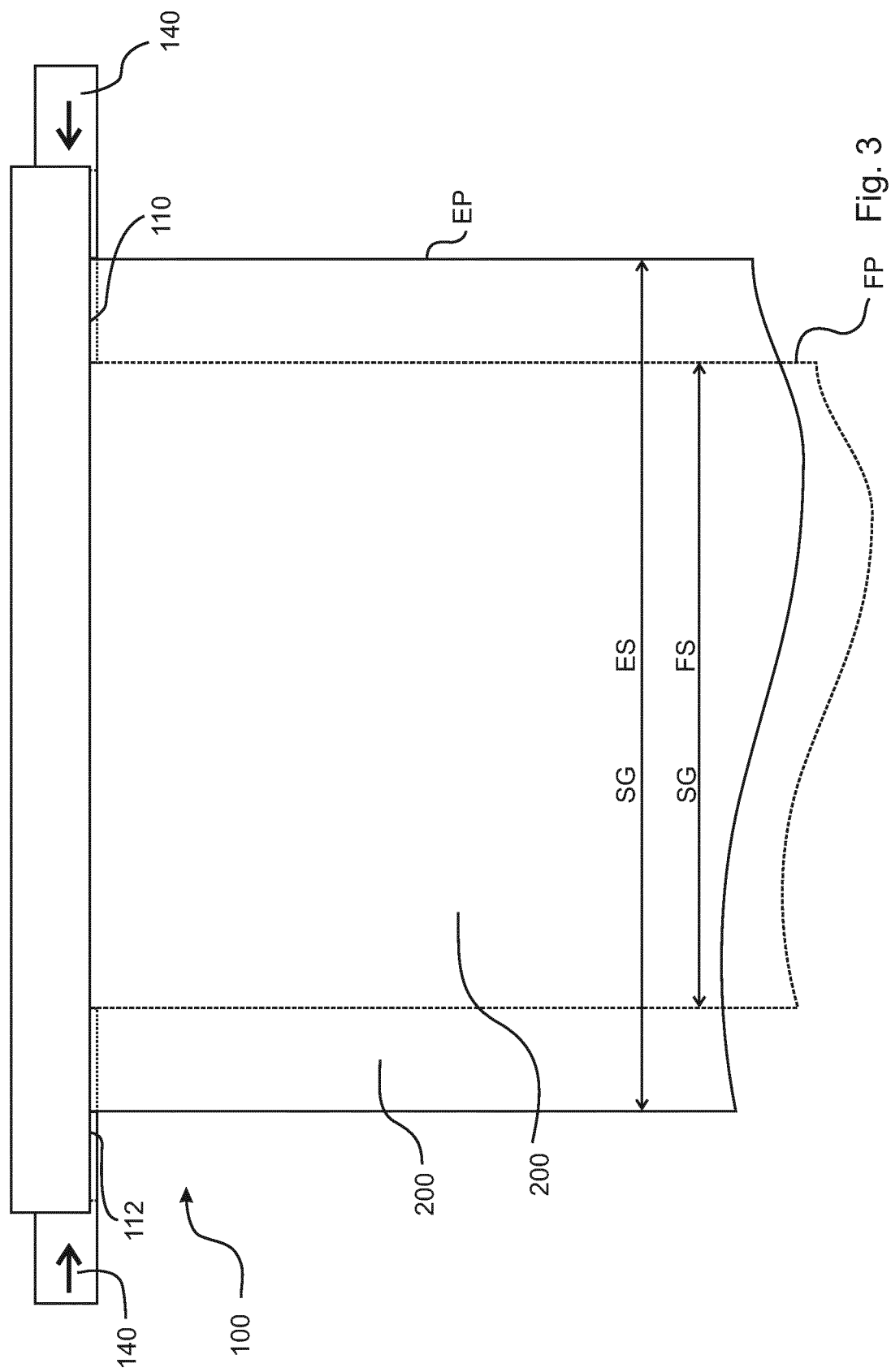

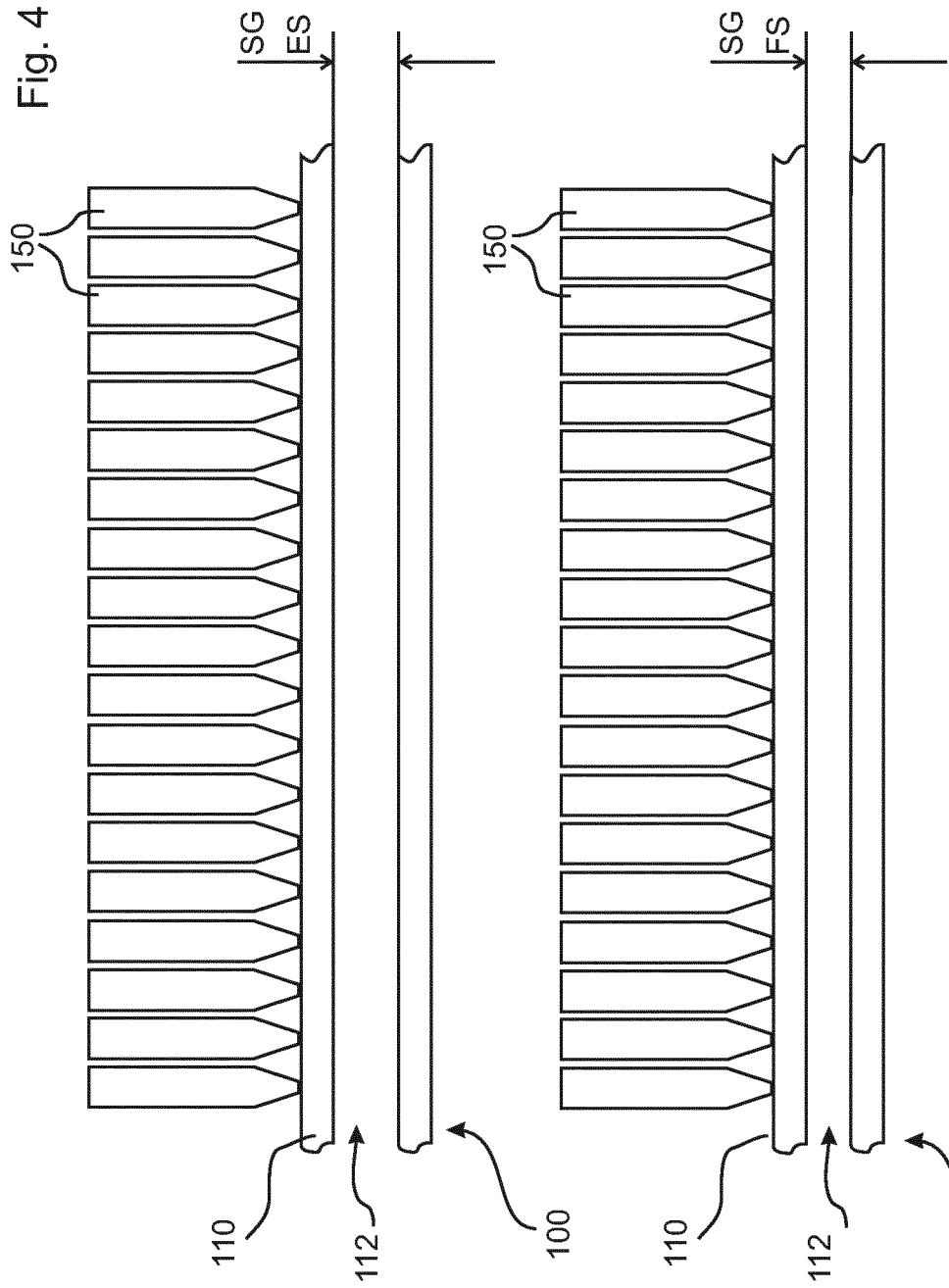

METHOD FOR SWITCHING THE PRODUCTION OF A FLAT FILM MACHINE FROM A FEED PRODUCT TO A FOLLOW-ON PRODUCT

INTRODUCTION

The present invention relates to a method for switching the production of a flat film machine from a feed product to a follow-on product, and to a switching device for carrying out such a method.

It is known that flat film machines are used to produce products in the form of flat films. Such flat film machines are usually equipped with a nozzle device which is capable of producing or discharging onto a wide film track. Via one or more extrusion devices, a melt stream can be fed to this nozzle device and distributed at it over the entire discharge width. Typical widths of such nozzle devices are in the range of one to ten or even more meters. In addition, it is also possible to coat or laminate the melt. For example, one or more flat tracks can be fed to the melt for this purpose.

The disadvantage of the known solutions is that a great deal of effort has to be expended in changing over different products, and at the same time there is no reproducibility of the changing mechanism. This is due to the fact that a large number of changing steps, which are necessary in order to change from one feed product to a follow-on product, are carried out manually. This can involve, for example, a change in the format, i.e. the discharge width of the film product. However, other changes are also conceivable in combination or alternatively, for example in the composition of the film product or the layer structure of the film product. If a change is made from a feed product to a follow-on product in the known solutions, a manual changing occurs, for example by changing lateral sealing blades in the form of a manual insertion or extension as well as a manual reworking or setting of adjusting bolts for the discharge slot of the nozzle.

It is an object of the present invention to at least partially eliminate the disadvantages described above. In particular, it is an object of the present invention to stabilize the changing between a feed product and a follow-on product in a cost-effective and simple manner and, in particular, to make this changing reproducible.

SUMMARY

The foregoing object is solved by a method with the features of the present disclosure and a switching device with the features of the present disclosure. Further features and details of the invention result from the dependent claims, the description and the figures. Features and details described in connection with the component according to the invention naturally also apply in connection with the method according to the invention and vice versa in each case, so that reference is or can always be made mutually with regard to the disclosure concerning the individual aspects of the invention.

According to the invention, a method for switching the production of a flat film machine from a feed product to a follow-on product is proposed. Such a method comprises the following steps:

recognizing a switching request for a switch from the feed product to the follow-on product, determining a current feed control value of at least one control variable of the flat film machine for the feed product, determining a follow-on control value of the same at least one control variable for the follow-on product, generating a control signal for a defined variation of the at least one control variable of the flat film machine from the feed control value to the follow-on control value.

In particular, a method according to the invention is automated or at least partially automated. Preferably, at least the last step, namely the generation of the control signal for a defined variation of the at least one control variable, is automated or partially automated. A method according to the invention can, for example, proceed as follows:

If a format switch is required in the simplest way, i.e. a reduction or an increase in the width of the film product from the feed product to the follow-on product, the procedure can be as follows. The switching request can be recognized either by manual input by the operating personnel or by recognizing the end of production of the feed product and thus an automated request profile for the changing. After this switching request has been recognized, the method according to the invention is used to determine a current feed control value for at least one control variable of the flat film machine. If, for example, the discharge width or the net width of the film track is to be changed, for example reduced from the feed product to the follow-on product, the associated feed control value is determined via this first determination step for the control variable of the net width of the feed product, for example as the feed control value of the measured net width at the end of the film track and/or for example as the feed control value of the discharge width at the nozzle discharge slot. Using a corresponding database or manual input, the target variable, namely the follow-on control value for the follow-on product, can also be determined in the same way for the exactly same at least one control variable. Thus, the starting point in the form of the feed control value and the target point in the form of the follow-on control value are now known to a controlling method or a corresponding regulation method. Based on the difference between the feed control value and the follow-on control value for the at least one control variable, the desired control signal can now be provided and generated in order to achieve a defined variation of the at least one control variable. In the present example, this would mean that the control signal is to ensure a variation of the net width for the film product. For example, the control signal can act on automatically operated sealing blades on the sides of the nozzle discharge slot. If the net width of the film product is to be reduced from the feed product to the follow-on product, this control signal would result in such an exemplary case in the retraction of the sealing blades to one or both sides of the nozzle discharge slot. The control variable, namely the discharge width from the nozzle discharge slot in this case, would thus be varied from a wide parameter according to the feed control value to a narrower parameter according to the follow-on control value. Thus, when directly influencing as a control variable for the discharge width, a direct regulation circuit can be provided. However, in the sense of the present invention, it is also conceivable that an indirect influence becomes possible as a control variable, namely in the form of the net width of the film product. The net width or possibly also the gross width can be changed, for example, by the discharge width as an indirect parameter of the production machine of the flat film machine. Thus, it is now possible to automatically influence a directly or indirectly influenceable control variable both directly and indirectly with the control signal.

Based on known solutions, a variety of advantages can now be achieved. The decisive factor according to the present invention is the correlation between the current feed control value and the desired follow-on control value as the target value of the controlling. This correlation can in particular be provided in an automated manner, and in conclusion allow the control signal to be automatically controlled and/or regulated. Compared to known solutions, an automation or partial automation of this changing from the feed product to the follow-on product can now be provided. This automation or partial automation now takes the responsibility from the operating personnel of the flat film machine and transfers it to the controlling method according to the invention. The susceptibility to errors and the possibly longer duration of the changing process in the event of faulty changing are significantly reduced in this way. Last but not least, this also makes it possible to design the changing from one feed product to a follow-on product in a reproducible manner. It should also be pointed out that, of course, not only a single control variable but also two or any number of control variables can be taken into account during the changing. The correlation of individual control variables to each other, for example the prioritization of individual control variables to each other, is of course also possible in the sense of the present invention. Thus, a method according to the present invention can lead to an automated or partially automated switching in the production of a flat film machine. The time required, the risk of a production stop and the risk of reject production during the changing process are reduced or even minimized in this way.

It may be advantageous if, in a method according to the invention, the feed product differs from the follow-on product by at least one of the following product parameters:

width of a film track
thickness of a film track
temperature of a film track
composition of a film track
layer distribution of a film track
quality parameters of the film track
production stability of the film track
film thickness ratio of the film track
temperature profile of the film track
width difference of the film track
control profile of adjusting bolts of the outlet nozzle
machine parameters of the flat film machine
discharge width of the outlet nozzle
thickness profile of the film track.

The above list is not exhaustive. The above product parameters can also be understood or used as indirect control variables. In particular, both usage parameters and quality parameters of the film track, but also production parameters and correspondingly stability parameters of the film track are conceivable for use according to the invention. Frequently, the products, i.e. the feed product and the follow-on product, even differ in two or more parameters as described above. The width of the film track can mean both the gross width and the net width after cutting off the edge sections. The thickness of the film track can be varied by the corresponding layer distribution, number of layers and thickness of the individual layers. The temperature of the film track is aimed in particular at the quality of the film track but also the stability and the production speed. The composition and layer distribution of the film track are geared in particular to the follow-on intended use, for example with reference to certain barrier properties or the mechanical stability of the film product.

It can also be advantageous if, in a method according to the invention, a stored flow behavior of the flat film machine, in particular of a nozzle device of the flat film machine, is taken into account when generating the control signal. During production with the flat film machine or also already during the production of the flat film machine, in particular of the nozzle device, the flow behavior within the flat film machine can be measured or simulated directly or indirectly, for example by reading out an adjusting bolt profile. By measurement or a simulation model, the flow behavior can be stored so that it can serve as a basis for the changing method according to the present invention. For example, this stored flow behavior can be used as a basis in the flat film machine for stability during the changing process, but also for desired quality changings between the feed product and the follow-on product, in order to achieve corresponding optimization steps during the changing with respect to quality and stability or the time required for the changing. Such a stored flow behavior can be specific to the respective product, i.e. the feed product or the follow-on product. Adaptation to such a profile is therefore now possible in the flat film machine. This flow behavior can be determined and stored once, but also adapted and adaptable by continuous monitoring or regular re-measurement. In particular, it is conceivable that after completion of a method according to the invention, a feedback into the stored flow behavior takes place in order to include the result of the switching method in the stored data of the stored flow behavior. In this way, general conditions of the machine, i.e. in particular of the nozzle device, can also be taken into account in the changing process.

Further advantages can be achieved if, in a method according to the invention, at least one stored production parameter of the flat film machine of a production database is taken into account when generating the control signal. Such a production database is designed in particular with specific product parameters of each individual different film product. For example, the stretch ratio, but also production parameters such as temperature, width ratios or thickness compositions can be stored in the production database. Other information, such as a control profile of adjusting bolts, positions of pinning devices or similar, can also be stored in the production database. Depending on the film recipe, as much individual information and product as well as production parameters as possible are stored accordingly in this production database. These can directly or indirectly contain the feed control values and/or follow-on control values, so that accordingly one or more control signals can correlate both directly and in an indirect manner with the contents of such a production database. Such a production database is preferably directly part of a corresponding switching device.

Further advantages can be achieved if, in a method according to the invention, at least one production parameter and/or a stored control signal from the changing database is taken into account when generating the control signal. In addition to the production parameter, which in particular can also be part of the production database according to the preceding paragraph, changing data are thus also conceivable, which can be taken into account. In particular, the changing database contains information on switches that have already been made between feed products and follow-on products. In principle, the changing based on the respective follow-on product, using the respective outgoing feed product, but also the explicit pairing between feed product and follow-on product can be the basis for storage in the changing database. The changing database thus contains, so to say, changing recipes for how and with which control signals the changing can be carried out. This leads to a significant simplification, since during the changing and in particular for the generation of the control signal, a significantly lower computational effort is necessary in an associated switching device. On the contrary, such a changing recipe can be processed simply and quickly, since no elaborate calculation and computation is necessary any more. By adopting, but also by adapting stored control signals feedback can also be provided to such a changing database. For example, successful but also faulty changing attempts and switches between the feed product and the follow-on product can be written back to the changing database, so that a learning system with quality-improving changing recipes can be made available in the changing database.

It is also advantageous if, in a method according to the invention, a melt flow distribution of the flat film machine is varied by the control signal. The melt flow distribution can be used, for example, with reference to the flow distribution as already explained. Here, a direct, but also an indirect adjustment is possible via the inflow to the nozzle discharge slot, but also for the nozzle discharge slot itself. A global adjustment of a control value is just as conceivable as a local adjustment at individual sections of the nozzle discharge slot. An adjustment of the total conveying capacity in the direction of flow upstream of the nozzle device is also conceivable in the sense of this embodiment.

There are further advantages if, in a method according to the invention, the control variable is formed by the working width of the flat film machine. This working width is in particular the discharge width from the nozzle discharge slot of the nozzle device. It can correlate with the gross width, but also with the net width of the film track of the feed product or the follow-on product. A change in this working width can be provided, for example, by lateral sealing blades. This working width is in particular one of the stored parameters in a changing database or a production database according to the paragraphs explained above.

It is also advantageous if, in a method according to the invention, a change in the position of at least one lateral sealing blade in a nozzle discharge slot of the flat film machine is generated as a control signal from the feed control value to the follow-on control value. Such a movement will in particular be automated or partially automated, so that a motorized drive moves the respective lateral sealing blade laterally into or out of the nozzle discharge slot by means of the control signal. In this way, the working width of the flat film machine and correspondingly the discharge width at the nozzle discharge slot can be changed in an automated or partially automated manner. In order to prepare the sealing blades for the movement, for example, adjusting bolts that clamp the sealing blades in the edge region can be actively released. If the adjusting bolts are thermal bolts, for example, active cooling, for example by means of air outlets for cooling air on these adjusting bolts, is also conceivable. Pinning devices can also be adjusted with a time delay or simultaneously, in particular analogously to the adjustment of the sealing blades.

Further advantages can be achieved if at least one quality parameter of the follow-on product is selected as the control variable in a method according to the invention. In particular, a quality parameter can be oriented to the use of the follow-on film product. For example, the stretch ratio, the temperature, the production speed or similar quality parameters can be used to influence the quality level at which the follow-on product can later be used. However, the quality can also relate to the stability of the production, so that the quality parameter is designed as a stability parameter of the follow-on product. This leads to a stabilization of the production, so that with relatively high production speed the switch production can be carried out, so that the time for the switch can be reduced. Increasing the stability also brings the advantage that there is a high probability that the film track will not be torn off, so that the switch between the feed product and the follow-on product can be carried out while production is essentially running. In particular, monitoring of the quality parameters will occur in the form of a quality threshold which must not fall below or be exceeded.

It is a further advantage if, in a method according to the invention, a local and/or a global slot size of a nozzle discharge slot of the flat film machine is selected as the control variable. In this case, a prior measurement can be carried out to determine the slot size with respect to the initial position. Slot sizes can be changed locally or globally, for example, by means of adjusting bolts. Such adjusting bolts are arranged in a plurality directly next to each other and can exert force from above on an upper nozzle lip of the nozzle discharge slot. A local influence means that only one or more adjacent adjusting bolts provide a corresponding influence for closing or opening the nozzle discharge slot. Global variation of the slot size requires a much larger number, in particular a movement of all or substantially all adjusting bolts for the global variation of the nozzle discharge slot. This allows for both on-the-fly readjustment and essentially jump adjustment between the feed product and the follow-on product.

Further advantages can be gained if, in a method according to the invention, an edge stability of the feed product and/or the follow-on product is selected as the control variable. In particular, the edge stability is decisive for the stability of the production process itself. The edge stability can be monitored separately and locally, and refers for example to the monitoring of the thickness or the thickness distribution in the edge region. The displacement of an edge groove or an edge bead can lead to a flattening of the edge bead and to a filling of a corresponding edge groove, so that a change and, in particular, an increase in the edge stability is possible as a result of the compensation between the thick spot and the thin spot. This stability is later also reflected in the quality of the product, since a defined longitudinal stretch ratio can be achieved.

It is a further advantage if, in a method according to the invention, at least two feed control values are varied into at least two follow-on control values at least partially simultaneously. The fact that the switching step is now carried out automatically or partially automatically according to the invention means that it is no longer necessary to work purely sequentially as in the case of manual changing according to the prior art. Instead, it is also possible to carry out an adjustment of the feed control values to the follow-on control values partially in parallel and thus simultaneously in time and/or symmetrically. This enables the desired changing to be carried out much more quickly, so that further time savings can be achieved while maintaining or even increasing quality. This parallel changing can be applied, for example, to two different edge sections of the film track.

Also an object of the present invention is a switching device for switching the production of a flat film machine from a feed product to a follow-on product. Such a changing device comprises a recognition module for recognizing a switching request for a switch from the feed product to the follow-on product. Further, a determination module is provided for determining a current feed control value of at least one control variable of the flat film machine for the feed product and for determining a follow-on control value of the same at least one control variable for the follow-on product. Furthermore, the switching device is equipped with a generation module for generating a control signal for a defined variation of the at least one control variable of the flat film machine from the feed control value to the follow-on control value. In particular, the recognition module, the determination module and/or the generation module is designed for carrying out a method according to the invention.

BRIEF DESCRIPTION OF THE FIGURES

Further advantages, features and details of the invention will be apparent from the following description, in which embodiments of the invention are described in detail with reference to the figures. Features mentioned in the claims and in the description may each be essential to the invention individually or in any combination. The figures show schematically:

FIG. 3 an embodiment of a flat film machine in top view,

FIG. 4 a detailed representation of the nozzle discharge slot in the feed product and FIG. 5 the embodiment of the figure in the follow-on product.

DETAILED DESCRIPTION OF THE INVENTION

Figure 1:
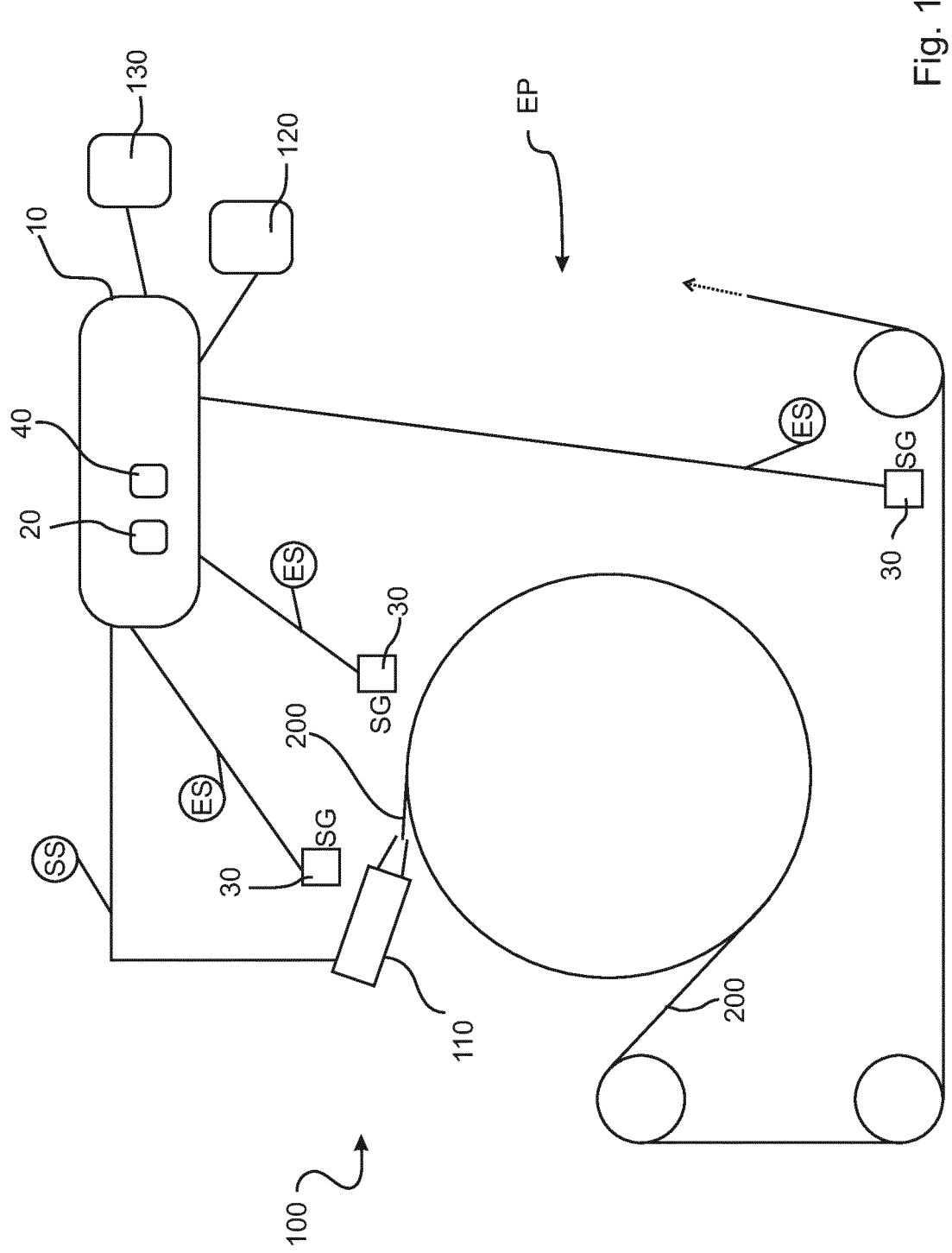
FIG. 1 an embodiment of a switching device according to the invention.
Figure 2:
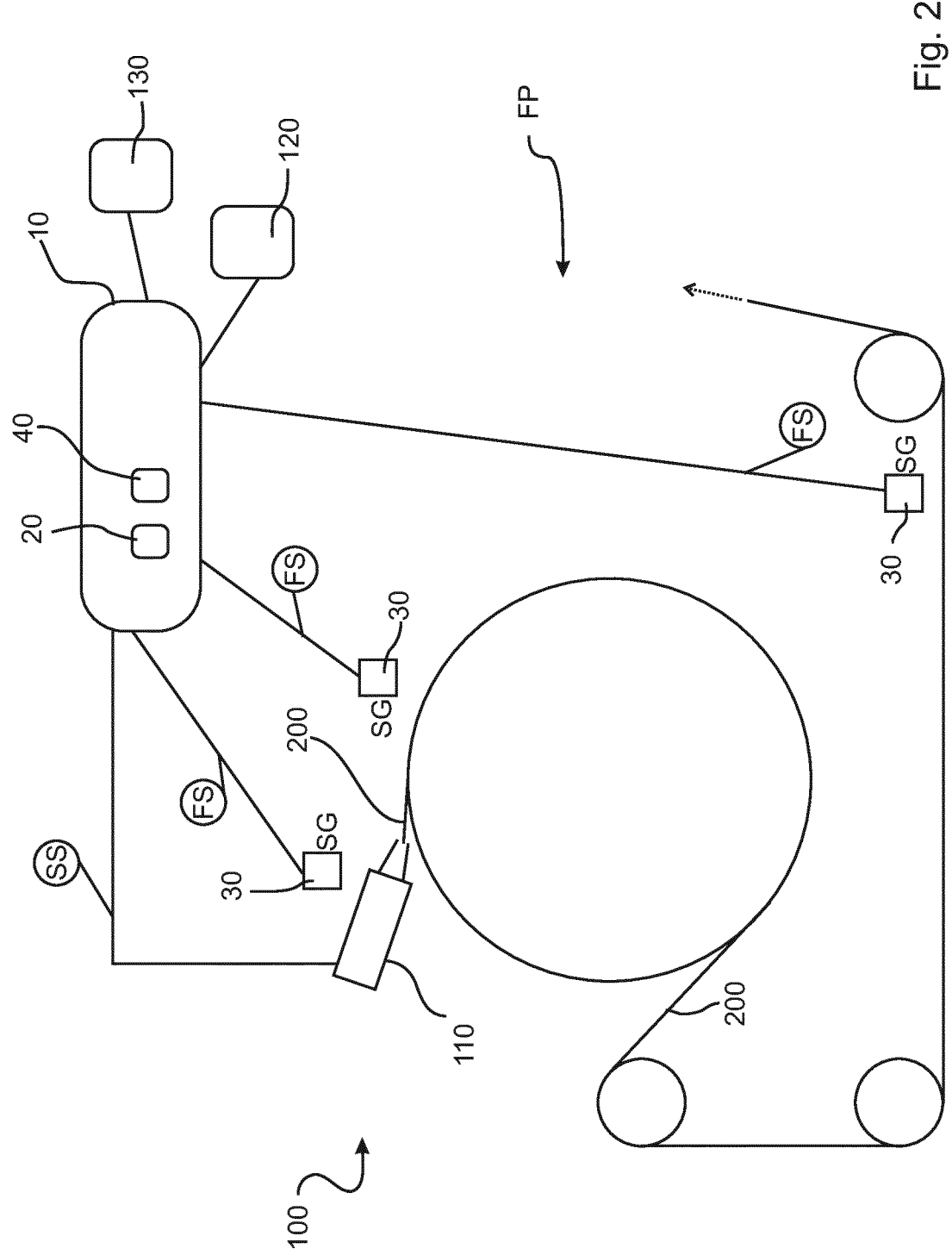
FIG. 2 the embodiment of FIG. 1 after changing to the follow-on product.

FIGS. 1 and 2 show schematically how a flat film machine 100 can be constructed. Via a nozzle device 100, it is possible to discharge a film track 200 while it is still in a liquid state and to apply it to a large cooling roller which is not described in more detail. The film track 200 now continues to run over a plurality of roll-like drums and can either be further processed, cut and/or wound up.

FIG. 1 shows the production of a feed product EP, in which, for example, a defined net width and/or a defined discharge width from the nozzle device 110 is specified. If a changing to a follow-on product FP is now desired, a control variable SG is detected by the switching device 10 according to this embodiment at one or more points as a feed control value ES. Here, for example, the determination module 30 at the bottom right may be the determination of the thickness. The middle determination module can, for example, detect the control variable SG in the form of the temperature on the cooling roller, while the left determination module 30 detects the nozzle discharge slot 112 of the nozzle device 110 as the control variable SG. The associated parameters can now be returned to the switching device 10 as feed control values ES. After the switching request has now been issued via the recognition module 20 and the feed control values ES have been collected, a control signal SS is generated in the generation module 40 and is forwarded here to the nozzle device 110, for example. During the generation in the generation module 40, for example, further data can be accessed. For this purpose, in the embodiment of FIGS. 1 and 2, for example, a production database 120 is provided, in which corresponding changing parameters, but also corresponding feed parameters for the feed product EP or the follow-on product FP are stored. In a changing database 130, changing recipes can be stored which comprise the control signal SS directly or as a template. Of course, after the changing has been carried out, feedback can also be provided here with regard to the success or with regard to recorded error cases, in order to form a learning system for the changing database 130 and/or the production database 120.

FIG. 2 shows the same configuration as FIG. 1, but after the variation has been carried out with the control signal SS. Here, for example, the respective control variable SG can now be further detected at the three determination modules 30 for controlling and to provide feedback on the achievement of the production state for the follow-on product FP, so that the achievement of the follow-on control value FS can also be recognized on the basis of the feed control value ES of FIG. 1. Thus, the end of the switch can be unambiguously assigned within the switching device by reaching the follow-on control values FS and, accordingly, the good production of the film track 200 can be defined.

A top view is schematically shown in FIG. 3, wherein in this flat film machine 100 the flat nozzle device 110 is provided with a corresponding width for the nozzle discharge slot 112. Also shown are a wide feed product EP and a narrower follow-on product FP. Here, the gross width is presented, i.e. the discharge directly from the nozzle slot 112. The corresponding control variables SG here relate to the width in terms of the feed control value ES and follow-on control value FS. For the changing from the feed product EP to the follow-on product FP, the control signal SS according to FIGS. 1 and 2 will now automatically or partially automatically move the lateral sealing blades 140 inward along the directions of the arrows, so that the discharge width at the nozzle discharge slot 112 is reduced accordingly. In this way, the discharge width of the film track 200 can be varied directly as a control variable SG. Indirectly, of course, this has an influence on a net width that can also be used as a control variable SG after trimming of this film track 200.

FIGS. 4 and 5 show an additional or alternative possibility of influencing the corresponding control variables SG. Here, the control variable SG is the local thickness or the discharge intensity from the nozzle discharge slot 112. Using corresponding adjusting bolts 150, which can be designed as thermal bolts, for example, a wide or thick local nozzle discharge slot 112 can now be changed over in accordance with a feed control value ES of FIG. 4, i.e. closed further, in order to be able to achieve a narrower nozzle discharge slot 112 corresponding to a follow-on control value FS in FIG. 5. Of course, a wide variety of control variables SG can be combined with a wide variety of feed control values ES and follow-on control values FS in order to achieve an acceleration and improvement of the changing behavior in parallel. In addition to a local adjustment, a global adjustment is also conceivable. Multiple adjustments can also be made in parallel and/or symmetrically.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS 10 switching device
20 recognition module
30 determination module
40 generation module
100 flat film machine 110 nozzle device
112 nozzle discharge slot
120 production database
130 changing database
140 sealing blade
150 adjusting bolt
200 film track
EP feed product
FP follow-on product
SG control variable
SS control signal
ES feed control value
FS follow-on control value

The invention claimed is:

1. A method for switching the production of a flat film machine from a feed product to a follow-on product, comprising:
   recognizing a switching request for a switch from the feed product to the follow-on product,
   determining current feed control values of at least two control variables of the flat film machine for the feed product,
   determining follow-on control values of the same at least two control variables for the follow-on product,
   generating control signals for a defined variation of the at least two control variables of the flat film machine from the feed control values to the follow-on control values,
   wherein according to the control signals the feed control values are varied into the follow-on control values simultaneously,
   wherein according to the control signals a correlation of the at least two control variables to one another, comprising a prioritization of the at least two control values to one another, is performed, and
   wherein according to the control signals the switching the production of a flat film machine is performed automated or semi-automated.

2. The method according to claim 1, wherein the feed product differs from the follow-on product by at least one of the following product parameters:
   width of a film track,
   thickness of a film track,
   temperature of a film track,
   composition of a film track,
   layer distribution of a film track,
   quality parameters of the film track,
   production stability of the film track,
   film thickness ratio of the film track,
   temperature profile of the film track,
   width difference of the film track,
   control profile of adjusting bolts of the outlet nozzle,
   machine parameters of the flat film machine,
   discharge width of the outlet nozzle, and
   thickness profile of the film track.

3. The method according to claim 1, wherein a stored flow behavior of the flat film machine is taken into account when generating the control signals.

4. The method according to claim 1, wherein a stored flow behavior of a nozzle device of the flat film machine is taken into account when generating the control signals.

5. The method according to claim 1, wherein at least one stored production parameter of the flat film machine from a production database is taken into account when generating the control signals.

6. The method according to claim 1, wherein at least one production parameter or a stored control signal from a changing database is taken into account when generating the control signals.

7. The method according to claim 1, wherein a melt flow distribution of the flat film machine is varied by the control signals.

8. The method according to claim 1, wherein the control variables are formed by the working width of the flat film machine.

9. The method according to claim 8, wherein a change in the position of at least one lateral sealing blade in a nozzle discharge slot of the flat film machine is generated as control signals from the feed control values to the follow-on control values.

10. The method according to claim 1, wherein at least one quality parameter of the follow-on product is selected as the control variables.

11. The method according to claim 1, wherein at least a local or a global slot size of a nozzle discharge slot of the flat film machine is selected as the control variables.

12. The method according to claim 1, wherein an edge stability at least of the feed product or of the follow-on product is selected as the control variables.

13. A switching device for switching the production of a flat film machine from a feed product to a follow-on product, comprising a computer-implemented recognition module for recognizing a switching request for a switch from the feed product to the follow-on product, a detector for determining current feed control values of at least two control variables of the flat film machine for the feed product and for determining follow-on control values of the same at least two control variables for the follow-on product, and a computer-implemented generation module for generating control signals for a defined variation of the at least two control variables of the flat film machine from the feed control values to the follow-on control values,
   wherein according to the control signals the feed control values are varied into the follow-on control values simultaneously,
   wherein according to the control signals a correlation of the at least two control variables to one another, comprising a prioritization of the at least two control values to one another, is performed, and
   wherein according to the control signals the switching the production of the flat film machine is performed automated or semi-automated.

* * * * *